United States Patent

Macovski

[11] 4,356,399
[45] Oct. 26, 1982

[54] TRANSPARENCY CONTRAST ENHANCEMENT SYSTEM USING A PLANAR ULTRAVIOLET SOURCE

[75] Inventor: Albert Macovski, Menlo Park, Calif.

[73] Assignee: Maxim Diagnostic Imaging, Palo Alto, Calif.

[21] Appl. No.: 198,218

[22] Filed: Oct. 17, 1980

[51] Int. Cl.³ ............................................. G01N 21/64
[52] U.S. Cl. ................................. 250/461.1; 350/399
[58] Field of Search .............. 250/461 R, 461 B, 483, 250/484, 487, 488, 504; 350/117, 399, 403, 407, 408; 355/67

[56] References Cited

U.S. PATENT DOCUMENTS

| 2,152,353 | 3/1939 | Lewin | 250/461 B |
| 2,933,602 | 4/1960 | Gillson, Jr. | 250/484 |
| 2,996,617 | 8/1961 | Heckscher | 250/488 |
| 4,002,914 | 1/1977 | Macovski | 250/461 R |

Primary Examiner—Alfred E. Smith
Assistant Examiner—Janice A. Howell

[57] ABSTRACT

A transparency is illuminated from the viewing side with a transparent planar structure producing ultraviolet light. A phosphorescent screen on the non-viewing side of the transparency produces visible light in response to the ultraviolet light to enhance the contrast. Back-illumination is used to provide adequate brightness in relatively dark areas.

9 Claims, 1 Drawing Figure

TRANSPARENCY CONTRAST ENHANCEMENT SYSTEM USING A PLANAR ULTRAVIOLET SOURCE

BACKGROUND OF THE INVENTION

1. Field of the Invention

This invention relates to transparency viewing systems. In a primary application the invention relates to multiple-pass illumination of radiographic transparencies which are difficult to interpret because of inadequate contrast using single-pass illumination.

2. Description of the Prior Art

Photographic transparencies often have over or under-exposed regions whose detail contrast is severely reduced. This is particularly true of radiographic transparencies which are under-exposed in relatively dense regions of the body. Thus relatively subtle lesions, such as small tumors, cannot be visualized because of the inadequate contrast.

One of the earliest examples of contrast enhancement is U.S. Pat. No. 2,152,353 issued to Hans Lewin on Mar. 28, 1939 entitled, "Roentgen Photography." In this patent a doubling of the contrast is achieved by illuminating the radiographic transparency with ultraviolet light and using a phosphorescent backing. This effectively doubles the contrast since the film density attenuates both the ultraviolet on the first pass and the visible fluorescent light on the second pass. Although this system improves the contrast of low-density under-exposed regions, it significantly reduces the visibility of medium and high density regions. In these cases the doubling of the density makes these regions essentially invisible. Thus an additional conventional viewing device with back-illumination only would be required. The radiologist would have to move the film from one viewing device to the other to view it over its entire range.

This difficulty was overcome by U.S. Pat. No. 4,002,914 issued to A. Macovski which described a system which included both UV front illumination for contrast enhancement and back-illumination for the darker areas.

Both of these patents, however, had the serious problem of the positioning and efficiency of the front illumination. Since the illumination conflicts with the head of the viewer, it must be separated from the phosphorescent backing screen, causing poor efficiency. In addition, the viewer's head can cause shadowing of the UV illumination if the viewer moves close to the transparency.

SUMMARY OF THE INVENTION

An object of this invention is to provide transparency viewing systems with increased contrast without restricting the position of the viewer.

It is a further object of this invention to provide a viewing system which efficiently illuminates the transparency to provide a high brightness contrast-enhanced image.

Briefly, in accordance with the invention a phosphorescent screen is placed behind the transparency. The transparency is illuminated from the viewing side using a transparent planar structure adjacent to the transparency which produces ultraviolet light. An additional controllable back illuminator is used on the nonviewing side of the transparency to illuminate the relatively dense regions.

DESCRIPTION OF THE PREFERRED EMBODIMENT

Figure 1:
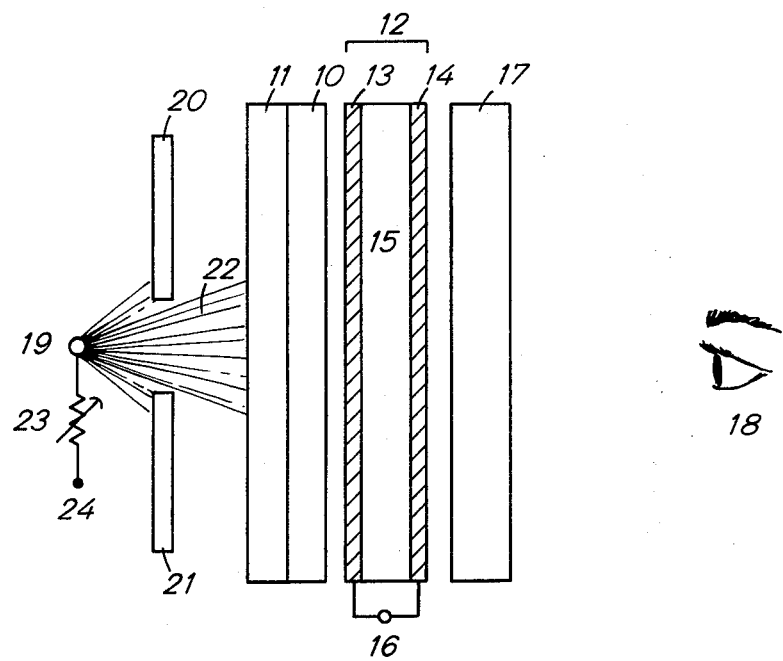
FIG. 1 is a schematic illustration of the invention.

An understanding of the broad aspects of the invention may best be had by reference to FIG. 1. A photographic transparency 10 has regions which require contrast enhancement. This transparency can be a radiograph with regions of relatively low exposure which are difficult to visualize. The radiograph can have regions of very subtle changes in density representing regions of disease such as tumors where the density change is too small to be visualized.

A phosphorescent screen 11 is placed behind the transparency. The phosphors used produce visible light when excited by ultraviolet light. The source of ultraviolet light is the planar structure 12. This consists of ultraviolet light emitting material 15 sandwiched between transparent conductors 13 and 14. These are driven by power source 16.

In its simplest embodiment the UV light from planar structure 12 passes through transparency 10, forming a visible image on the transparency on the phosphorescent screen 11. The resultant visible light from phosphorescent screen 11 passes through the transparency again and is viewed by viewer 18. This double pass of light through the transparency doubles the resultant contrast. Thus a region which initially has a small density change on the film, such as 0.2, will experience an effective 0.4 change and be much more readily visualized.

In the configuration of the invention, as distinguished from the prior art, the viewer is not at all restricted in his access to the image. He can come as close as he likes and not cause shadowing since the light source is between him and the film and is totally transparent. Also, the proximity of the UV source 12 to the phosphorescent screen 11 greatly increases the efficiency and thus the brightness of the resultant image.

The UV emitting material 15 in planar structure 12 can be gaseous or solid. The solid material would in general be an electroluminescent material. These are generally ZnS with activators such as Mn, Cu, and Te. These can either be in a powder form or in the form of a thin film. If the powder form is used the UV planar source structure 12 will have to be very close to transparency 10 to avoid a loss of resolution since the powder material will form a diffuse translucent structure. If the material 15 is in the form of a transparent thin film, its position with respect to transparency 10 is relatively non-critical since it does not affect resolution. Electroluminescent materials can be driven by AC or DC power sources 16. A detailed description of electroluminescence is given by E. W. Chase, et al., "Electroluminescence of ZnS Lumosen devices containing rare-earths and transition-metal fluorides, "*J. Applied Physics,* Vol. 40, pp. 2512–2519, May 1969.

A gaseous UV source can be produced where material 15 is a Xenon-based gas mixture. A representative pressure is about 20 Torr. These can also be driven by AC or DC power sources 16. A more detailed description of the production of UV light using gas discharge is given by Z. van Gilder, "Principles and techniques in multicolor DC gas discharge displays," *Proc. IEEE,*

Vol. 61, pp. 1019–1024, July 1973. As with the transparent electroluminescent material, the intimate proximity to the transparency 10 is not a consideration.

Mirror 17 is a dichroic mirror, usually consisting of an array of dielectric layers. It reflects ultraviolet light and transmits visible light. This serves two purposes. It prevents ultraviolet light from reaching the viewer 18, and also enhances the brightness of the image by reflecting the UV light back toward transparency 10.

In darker regions, double pass illumination results in excess optical density with the resultant image being almost invisible. These regions can be visualized by illumination from the back by back-illumination source 19. This light source goes through transparency 10 once and thus does not experience enhancement or density increase. This light can be a visible light in which case phosphorescent screen 11 must be at least partially transmissive to visible light. Alternatively back-illumination source 19 can be in the ultraviolet region. In that case it will cause phosphorescent screen 11 to uniformly fluoresce and back-illuminate transparency 10.

It is often desirable to back illuminate specific darker regions of a radiograph, such as the lung fields of a chest X-ray. This selective illumination can be accomplished by masking light source 19 using controlled mask 20 and 21. These provide opaque regions which can be moved to vary the size of aperture 22. They can represent a slit which can be varied in position and size. The slit can be controlled in both dimensions to represent a rectangle of any size at any position.

The intensity of the back-illumination can be controlled by power control 23 connected to power source 24. Some areas of intermediate density can benefit from proper combinations of back and front illumination. Power control 23 provides these ratios.

Although in FIG. 1 the viewer 18 is indicated as the human eye, it can represent any image reproducing system such as a photographic or television camera. In many cases it is desired to reproduce the enhanced contrast image in photographic form. This is accomplished by using a photographic camera for viewer 18 where the camera is focused on transparency 10.

What is claimed is:

1. Apparatus for viewing a transparency comprising a phosphorescent screen on which the transparency is placed and a planar structure which transmits visible light and produces ultraviolet light which is placed adjacent to the transparency between the transparency and the viewer.

2. Apparatus as recited in claim 1 wherein the planar structure comprises a gaseous chamber with transparent electrodes on both sides parallel to the phosphorescent screen and voltage means for driving the transparent electrodes whereby the gas will ionize and produce ultraviolet light.

3. Apparatus as recited in claim 1 wherein the planar structure comprises transparent electroluminescent material with transparent electrodes on both sides parallel to the phosphorescent screen and voltage means for exciting the electroluminescent material and producing ultraviolet light.

4. Apparatus as recided in claims 1,2 or 3 including a mirror adjacent to the planar structure between the planar structure and the viewer which substantially reflects ultraviolet light and transmits visible light.

5. Apparatus as recited in claims 1,2 or 3 including a back illuminator on the nonviewing side of the phosphorescent screen.

6. Apparatus as recited in claim 5 where the back illuminator produces visible light and the phosphorescent screen transmits visible light.

7. Apparatus as recited in claim 5 where the back illuminator produces ultraviolet light which excites the phosphorescent screen.

8. Apparatus as recited in claim 5 where the intensity of the back illuminator is controllable.

9. Apparatus as recited in claim 5 where the region on the transparency illuminated by the back illuminator source is controllable.

* * * * *